(12) United States Patent
Fedderly et al.

(10) Patent No.: US 6,545,118 B1
(45) Date of Patent: Apr. 8, 2003

(54) POLYMER HAVING NETWORK STRUCTURE

(75) Inventors: Jeffry J. Fedderly, Ellicott City, MD (US); John D. Lee, Potomac, MD (US); Gilbert F. Lee, Greenbelt, MD (US); Bruce Hartmann, deceased, late of Silver Spring, MD (US), by Judy Hartmann, legal representative; Karel Dusek, Prague (CZ); Jan Somvarsky, Praha (CZ)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/994,988

(22) Filed: Nov. 8, 2001

Related U.S. Application Data
(60) Provisional application No. 60/251,050, filed on Dec. 5, 2000.

(51) Int. Cl.$^7$ ................................................ C08G 18/48
(52) U.S. Cl. .............................. 528/49; 528/68; 528/77; 156/331.4; 156/331.7; 428/423.1; 248/564
(58) Field of Search .............................. 528/49, 77, 68; 156/331.4, 331.7; 428/423.1; 248/564

(56) References Cited

U.S. PATENT DOCUMENTS

| | | | |
|---|---|---|---|
| 4,155,892 A | * | 5/1979 | Emmons et al. |
| 4,242,468 A | * | 12/1980 | Baack et al. |
| 4,348,307 A | * | 9/1982 | Noethe |
| 4,618,651 A | | 10/1986 | Gilch et al. |
| 4,719,247 A | | 1/1988 | Lin et al. |
| 4,863,994 A | * | 9/1989 | Nelson et al. |
| 5,010,133 A | | 4/1991 | Seville |
| 5,493,000 A | | 2/1996 | Aharoni |
| 5,877,255 A | | 3/1999 | Gerber et al. |

OTHER PUBLICATIONS

Technical Paper—Randrianantoandro, H. et al., "Viscoelastic Relaxation of Polyurethane at Different Stages of the Gel Formation. 1. Glass Transition Dynamics", Macromolecules, 1997, 30, 5893–5896.

Technical Article "Multifunctional Polyurethane Network Structures" by Jeffry J. Fedderly, et al., Macromolecular Symposia Wiley–VCH pp. 1–14, Dec. 1999.

Jeffry J. Fedderly, Gilbert F. Lee, John D. Lee, Bruce Hartmann, Karel Dusek and Jan Somvarsky,"Multifunctional Polyurethane Network Structures", Oral Presentation of Abstract at International Conferences on Polymer Characterization, POLYCHAR–7, Jan. 5–8, 1999.

Jeffry J. Fedderly, Gilbert F. Lee, John D. Lee, Bruce Hartmann Karel Dusek, Miroslava Duskova–Smrckova and Jan Somvarsky, "Network Structure Dependence of Volume and Glass Transition Temperature", The Society of Pheology, Inc., J. Rheol. 44(4), Jul./Aug. 2000 pp. 961–972.

Jeffry J. Fedderly, Gilbert F. Lee, John D. Lee, Bruce Hartmann, Karel Dusek, Jan Somvarsky and Miroslava Smrckova, "Multifunctional Polyurethane Network Structures", Macromolecular Symposi 148, Wiley–VCH Verlag GmbH, D–69469, Weinheim, 1999 pp. 1–14.

* cited by examiner

*Primary Examiner*—Rachel Gorr
(74) *Attorney, Agent, or Firm*—Jane Barrow

(57) ABSTRACT

A series of polymeric compositions, methods of making the compositions and uses of the compositions are described. An exemplary composition is made by copolymerization of a trifunctional amine or hydroxy compound, a monofunctional amine or hydroxy compound and a polyisocyanate compound.

40 Claims, 3 Drawing Sheets

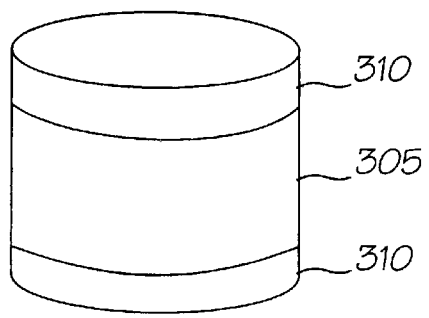
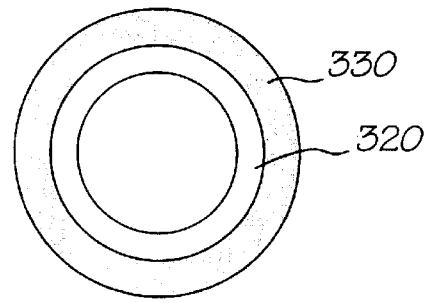
FIG. 3A  FIG. 3B
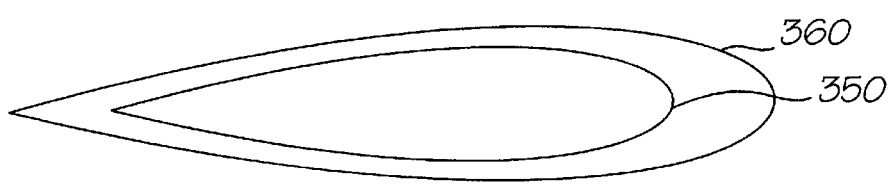
FIG. 3C

POLYMER HAVING NETWORK STRUCTURE

CROSS-REFERENCE TO RELATED APPLICATION

This application claims the benefit of U.S. Provisional Application No. 60/251,050 filed Dec. 5, 2000 entitled "Polymer Having Network Structure," incorporated herein by reference.

BACKGROUND OF THE INVENTION

1. Field of the Invention

The present invention relates to the field of synthetic resins, particularly to resins having a network structure, and more particularly to resins having urea or urethane linkages.

2. Description of the Related Art

Polymeric compositions having a network structure may be prepared using building block compounds which react to link with three or more other building blocks in the composition. Such networked polymers may contain very high molecular weight molecules, and in some cases an entire bulk sample represents essentially a single molecule, with every atom covalently linked to the other atoms in the composition.

An example of such a polymeric composition can be seen in Randrianantoandro et al., "Viscoelastic Relaxation of Polyurethane at Different Stages of the Gel Formation. 1. Glass Transition Dynamics, "*Macromolecules,* 1997, 30, 5893–5896. This paper describes polyurethanes made by condensing a polyoxypropylene triol with hexamethylene diisocyanate. Here, the polyoxypropylene triol is a polypropylene oxide adduct of trimethylol propane, and is trifunctional in that the triol has three hydroxy groups to react with the isocyanate groups of the diisocyanate. The paper also describes polyurethanes made from the further addition of a polypropylene oxide diol or from the further addition of phenyl-2-propanol, a monoalcohol.

Many different physical parameters are of interest in assessing polymer performance, including glass transition temperature, modulus as a function of frequency, and creep compliance. Often it is difficult to achieve desirable values of two or more of these parameters in a single polymer composition, and there is therefore a need for new compositions with novel properties. For example, in polyurethanes made from trifunctional hydroxy compounds (triols), difunctional hydroxy compounds (diols) and diisocyanates, compositions which are very soft, that is, which have a low value of rubbery modulus, tend to lose structural integrity.

SUMMARY OF THE INVENTION

It is therefore an object of the present invention to provide a novel networked polymer.

A further object of the invention is to provide a polymer having novel polymer performance.

A yet further object of the invention is to provide a polymer having low creep and low rubbery modulus.

These and other objects are achieved by the present invention, which includes novel polymer compositions, methods of making the compositions, and methods of using the compositions.

An exemplary composition of the invention is made by copolymerization of a trifunctional amine or hydroxy compound, a monofunctional amine or hydroxy compound and a diisocyanate compound. The resulting compositions may be used in a variety of applications, and may have combinations of properties which are generally difficult to achieve.

BRIEF DESCRIPTION OF THE DRAWINGS

A more complete appreciation of the invention, and many of the attendant advantages, thereof, will be readily apparent as the same becomes better understood by reference to the following detailed description when considered in conjunction with the accompanying drawings in which like reference symbols indicate the same or similar components, wherein:

FIG. 3A is a schematic illustration of a typical shock mount employing a polymer composition of the invention;

FIG. 3B is a schematic illustration of a pipe having a coating of a polymer composition of the invention; and FIG. 3C is a schematic illustration of a cross-section of a turbine blade having a coating of a polymer composition of the invention.

DETAILED DESCRIPTION OF THE INVENTION

Figure 1:
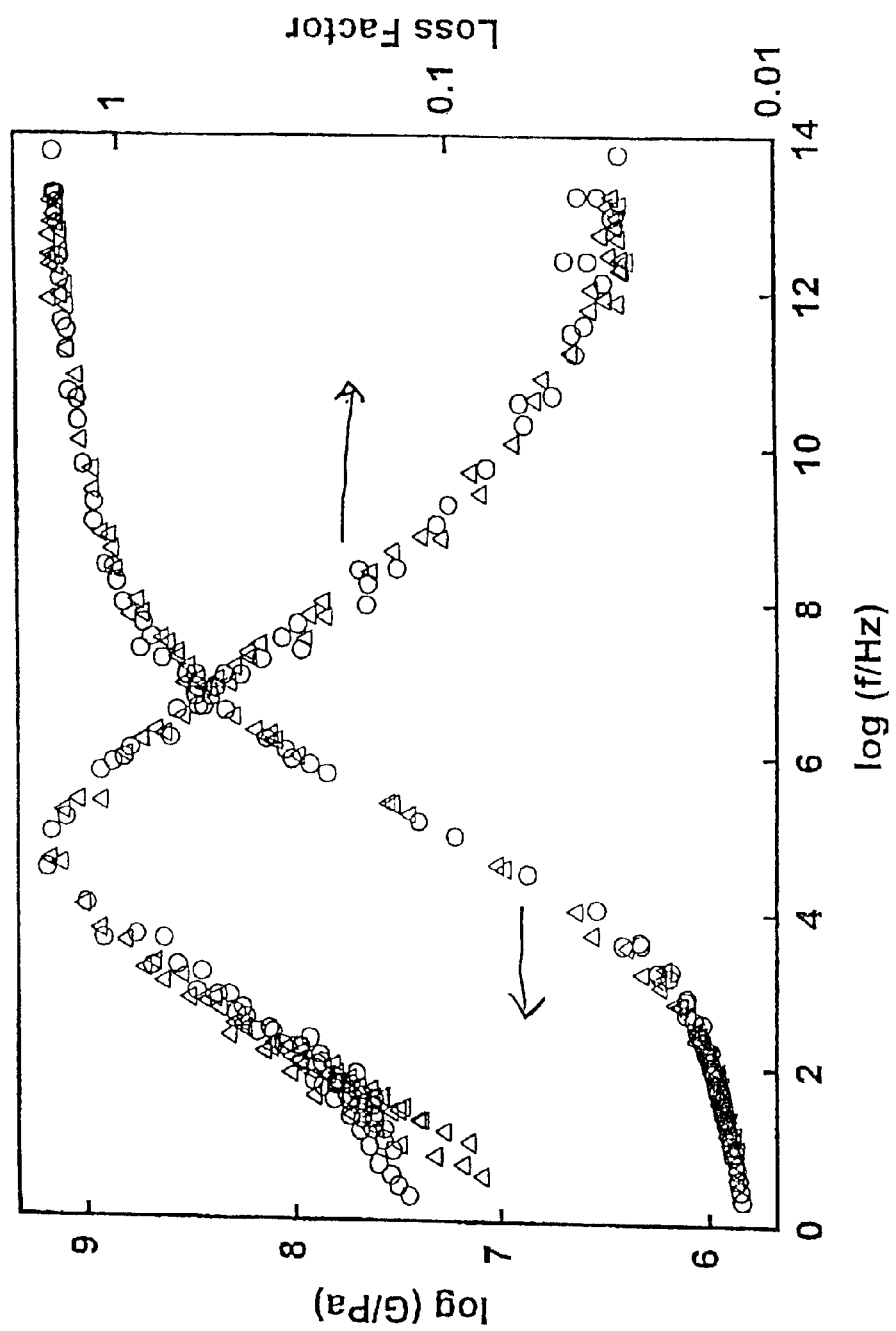
FIG. 1 is a chart comparing dynamic properties of an example of a polymer composition of the invention to a comparative polymer composition.

In describing the invention, the following terms will be used:

"Organic group" will be used to refer to carbon-containing moiety. An organic group in general may be as small as a one-carbon methyl group, but most organic groups are larger and have some carbon—carbon bonds.

"Monofunctional", "difunctional" and "trifunctional" will here refer to the presence of a chemical group which is, or which can react to become, a linkage in a polymeric composition. In the present invention, the linkages of interest are the urethane linkage, —O—(CO)—NH—, and the urea linkage, —NH—(CO)—NH—. Thus, a monofunctional organic group in a polymer of the invention is a carbon-containing moiety which is connected to a single urea or urethane linkage, a difunctional organic group in a polymer of the invention is a carbon-containing moiety connected to two linkages, etc.

Polyurethanes are typically made by the reaction of polyols with polyisocyanates, resulting in the organic moiety of the polyol being O-linked and the organic moiety of the polyisocyanate being N-linked in the resulting urethane linkages. Polyureas are typically made by the reaction of polyamines with polyisocyanates. In the present application, then, a "monofunctional" starting material will refer to an organic moiety having a single amine or hydroxy group, therefore capable of forming a single urethane or urea linkage. "Difunctional" will refer to an organic moiety having a total of two amine or hydroxy groups. Typically, but not necessarily, both groups will be amines or both will be hydroxys. "Trifunctional" will likewise refer to an organic moiety having a total of three amine or hydroxy groups, typically a triamine or triol.

As to polymer properties, "shear modulus", abbreviated G, which will here be referred to as "modulus", is a well known measure of softness or stiffness of a material, with methods for measuring modulus well known in the art. Modulus is a frequency dependent parameter, and the modulus at zero frequency is known as the "rubber modulus", abbreviated $G_0$. In general, rubbery modulus may be measured by different methods known in the art, including extrapolation from high frequency dynamic master curve data. However, for purposes of this invention, rubber modulus is measured using creep compliance data, as explained below.

"Loss factor" is a measure of the inelasticity of a polymer, and is also a frequency dependent parameter. Loss factor commonly peaks at a particular frequency value, and this peak frequency is an inherent property of the polymer.

"Glass transition temperature" is the temperature at which a polymer changes from a glass state to a rubbery state, and is measured by differential scanning calorimetry.

"Creep" is a measurement of the elongation of a polymer sample under a load. Resistance to creep can be measured in a time-dependent manner, and can be expressed at the amount of time necessary to reach a certain fraction of the ultimate elongation.

The structures of the polymers of the present invention may be understood by considering the following exemplary reaction scheme for a polyurethane compound. The present invention is generally applicable, however, to both polyurethanes and polyureas, as well as mixed polyurethane-polyureas In the exemplary reaction, a trifunctional hydroxy compound has general structure

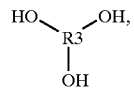

, where R3 is an organic moiety no additional hydroxy or amine groups other than the three in the trifunctional compound. In the present invention, R3 has a molecular weight of greater than 200, and thus the trifunctional hydroxy compound has a molecular weight of greater than about 250.

A monofunctional hydroxy compound has general structure R1—OH. Here, R1 is an organic moiety that has no additional hydroxy or amine groups other than then one in the monofunctional compound. In the present invention, R1 has a molecular weight of greater than 140, and the monofunctional compound therefore has a molecular weight of greater than about 155.

A polyisocyanate compound has general structure $D(NCO)_n$, where N>1, and D is an organic moiety. A diisocyanate compound, for example, has general structure OCN—N—NCO.

An exemplary polyurethane polymer composition of the invention is made by mixing amounts of a trifunctional hydroxy compound of molecular weight greater than 250, a monofunctional hydroxy compound of molecular weight greater than 155, and a polyisocyanate, resulting in the reaction of hydroxy groups with isocyanate groups to form urethane linkages. Generally, the compounds will be mixed in a ratio such that there is approximately an equal number of isocyanate groups to hydroxy groups. This ratio will almost always be achieved within plus or minus 10%, and usually within plus or minus 3% of the ideal stoichiometric ratio. After complete reaction, this results in a compound without excess hydroxy or isocyanate groups. An actual copolymerization reaction, of course, will generally result in a slight excess of hydroxy or isocyanate groups.

The ratio of linkage groups X to groups D will reflect the functionality of group D. For example, when a diisocyanate compound is used, group D is difunctional, and the ideal mole ratio would be 2:1. In practice, the mole ratio of urethane linkage groups to groups D is considered to be approximately 2:1 to reflect the fact that the stoichiometry may not be exact, and that reaction efficiency is not 100%. Likewise, a triisocyanate compound would have a trifunctional group D, and an idea mole ratio of 3:1, which in practice would be approximately 3:1.

The resulting polymer composition will have the organic moiety of the polyisocyanate, group D, linked through urethane linkages both to groups R1 and R3, and thus the resulting composition will have subunits, that is, portions of the overall structure, represented by

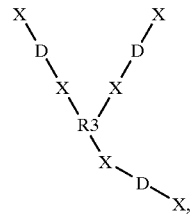

, and subunits represented by R1—X—D—X, where X represents the urethane linkage. The above illustrated subunits show two linkages, that is, the minimal number, on group D. Only two linkages would be present when D is difunctional, such as would result from using a diisocyanate compound. In the case of higher functionality of group D, additional linkages X, not shown in the subunit structure, would correspondingly be present. Thus, the above subunit as illustrated does not preclude more than two linkages to group D.

As noted above, the present invention also applies to polyureas, in which case X would represent the urea linkage, and an analogous exemplary preparation of these compounds would be using trifunctional amines and monofunctional amines. The present invention also includes urea-urethane mixtures, in which case X could represent either urea or urethane, and these could be prepared using trifunctional and monofunctional amine or hydroxy compounds.

Because the trifunctional hydroxy or amine compound can connect to three of the polyisocyanate compounds, the resulting composition is not a linear polymer, and in fact develops a network structure, as in a cross-linked polymer. Thus, the molecular weight of polymer molecules in the composition is very high, and it is possible for an entire sample of the composition to be a single molecule. The structure of the polymer is determined somewhat by the ratio of the trifunctional moiety R3 to the monofunctional R1, which is determined by the ratio of the trifunctional and monofunctional compounds in the reaction mixture.

As noted above, in the invention R1 is a group with molecular weight above 140, and the molecular weight of group R1 may, for example, be greater than 300. Group R1 may have repeating subunits, that is, may have a portion that in itself would be considered a polymer. As such, the monofunctional hydroxy or amine compound used may not be a pure chemical compound, but may be a mixture of compounds of different molecular weight.

Likewise, R3 is a group with molecular weight above 200, and the molecular weight may be greater than 600, for example, in the range of 1000 to 5000. As is the case for R1, R3 may have repeating subunits, and the trifunctional compound used may be mixture of compounds of different molecular weights.

When R1 or R3 does contain repeating units, any of a variety of repeating units may be used. For example, R1 or R3 may have a subunit which is a polyether, a polyester, a polybutadiene or a polyamide. An example of a polyether is polypropylene oxide, in which case the subunit [—$CH_2$—$CH(CH_3)$—O—$CH_2$—$CH(CH_3)$—O—] would be present.

The polyisocyanate compound may be a pure compound, or may also alternatively be a mixture of compounds. For example, diphenylmethyldiisocyanate (MDI) is commercially available as a mixture of two isomers. Thus, group D may represent a mixture of organic moieties.

The compositions of the present invention may be made from the above three compounds with no additional ingredients. In this case, the resulting compound could be considered to consist essentially of the groups, R1, R3, D and the linkage groups X.

Alternatively, other reactive compounds could be incorporated into the reaction mixture. For example, a difunctional hydroxy compound, of general formula HO—R2—OH, could be included in the exemplary preparation. Here, group R2 is an organic group of molecular weight greater than 200, and the corresponding difunctional amine or hydroxy compound would have molecular weight greater than about 230. The presence of group R2 would lead to the presence of additional subunits of structure X—D—R2—D—X in the composition. The above described ratio of linkage groups X to groups D would be the same in these compounds.

As noted above, the ratio of groups R3 to R1 can strongly affect properties of the composition. In a composition of the present invention, the mole ratio of the trifunctional moieties, R3, to the monofunctional moieties R1, will typically be in the range of 9:1 to 1:2. The ratios may, for example, be in the range of 4:1 to 1:1 to ensure obtaining a cross-linked polymer.

The method of making polymer compositions of the present invention will now be described. Typically, a polymer of the present invention may be made by mixing together an organic trifunctional hydroxy or amine compound of molecular weight greater than 250, an organic monofunctional amine or hydroxy compound of molecular weight greater than 155, and an organic polyisocyanate compound. The mixture is then allowed to cure until the reaction of the isocyanate groups and hydroxy or amine groups is essentially complete.

The reaction mixture may further contain a difunctional hydroxy or amine compound as discussed above. Moreover, a catalyst may be added to the reaction mixture to increase the speed of the curing reaction. A tin catalyst, such as dibutyltin dilaurate may be used in this case.

The hydroxy or amine compounds may be blended together before the addition of the diisocyanate. Also, the reactant compounds may be vacuum degassed before mixing or after mixing. Extensive drying of the reactant compounds before mixing can also be performed.

Typically, the reaction mixture will be cast or otherwise molded into a desired final shape before curing. The curing will typically be performed at −20 to 100° C., and may be performed, for example, at room temperature or at an elevated temperature of 70° C. Curing may occur for as long as several days, and for some purposes it may be desirable to dry the polymer after curing for as long as several days.

The properties of the resulting polymer composition are affected by the ratio of the trifunctional and monofunctional compounds used in the preparation. In developing particular polymers having particular properties, it may be desirable to prepare different batches of polymer using different ratios of these compounds, and to determine the affect of the ratio on properties of interest.

It is possible to produce polymer compositions of the present invention with properties which are difficult to otherwise achieve. For example, it is common with known polyurethanes for very soft compositions to have poor creep properties. The following actual examples of polymers of the invention illustrate some of the obtainable properties.

Inventive Examples. A series of polymers of the invention was prepared as follows. Monofunctional, difunctional, and trifunctional hydroxy compounds based on hydroxyl-terminated poly(propylene oxide), (abbreviated PPO), were commercially obtained. The monofunctional compound consisted of a blend of products produced by Union Carbide, Inc., UCON LB-65 and UCON-LB-135, which are of nominal molecular weight 400 and 700, respectively. These were blended to an average nominal molecular weight of 500.

The difunctional compound was Poly-G 20-112 (Olin Chemical) and the trifunctional compound was Poly-G 30-112. Poly-G 20-112 has two poly(propylene oxide) chains extending from a central group and Poly-G 30-112 has three poly(propylene oxide) chains extending from a central group. These compounds have similar nominal molecular weights of the two poly(propylene oxide) chain portions to the monofunctional compound.

Desired blends of the monofunctional, difunctional and trifunctional compounds were prepared and degassed with stirring at 50° C. for one to two hours. A stoichiometric amount of Mondur ML (Bayer Chemical), a blend of 4,4' and 2,4'-diphenylmethane diisocyanate (MDI), was added and the mixed material was cast into aluminum molds preheated to 70° C., then cured at 70° C. for three days. The samples were demolded and disiccated at 50° C. for another three days.

Comparative Examples. Comparative Examples were made using the same procedure as for the Inventive Examples above, except that no monofunctional compound was used in the preparation of the Comparative Examples.

Differential scanning calorimetry was performed using a DuPont model 910 DSC cell and model 9900 controller, on thin flat sections of approximately 10 mg, at a scanning rate of 10° C./min, under a nitrogen atmosphere. Glass transition temperatures, $T_g$, were determined from the inflection points in the DSC thermograms.

Dynamic mechanical properties were measured using a resonance technique as described in Madigosky, W. M.; Lee, G. F, J. Acoust. Soc. Amer., 1983, 73, 1374. Measurements were made over 1 decade of frequency in the kHz region from −60 to 70° C. at 5 degree intervals. These data are used to generate a reduced frequency plot at a constant reference temperature.

Table I lists Inventive Example and Comparative Example polymer compositions, as well as the observed densities and glass transition temperatures.

TABLE I

Properties of Polymer Composition Examples.

| Label | mole fraction monofunctional | mole fraction difunctional | mole fraction trifunctional | $\rho/(g/cm^3)$ | $T_g/°C.$ |
|---|---|---|---|---|---|
| Comp. Ex. 1 | 0 | 1.000 | 0 | | −28.6 |
| Comp. Ex. 2 | 0 | 0.867 | 0.133 | 1.076 | −28.3 |
| Comp. Ex. 3 | 0 | 0.786 | 0.214 | 1.074 | −26.9 |
| Comp. Ex. 4 | 0 | 0.582 | 0.418 | 1.078 | −25.1 |
| Comp. Ex. 5 | 0 | 0.378 | 0.622 | 1.081 | −25.9 |
| Comp. Ex. 6 | 0 | 0 | 1.00 | 1.082 | −22.9 |
| Inv. Ex. 1 | 0.500 | 0 | 0.500 | 1.072 | — |
| Inv. Ex. 2 | 0.217 | 0.434 | 0.349 | 1.075 | — |
| Inv. Ex. 3 | 0.434 | 0 | 0.566 | 1.072 | −26.9 |

TABLE I-continued

Properties of Polymer Composition Examples.

| Label | mole fraction monofunctional | mole fraction difunctional | mole fraction trifunctional | $\rho/(g/cm^3)$ | $T_g/°C$ |
|---|---|---|---|---|---|
| Inv. Ex. 4 | 0.196 | 0.393 | 0.411 | 1.075 | — |
| Inv. Ex. 5 | 0.393 | 0 | 0.607 | 1.077 | −29.0 |
| Inv. Ex. 6 | 0.291 | 0 | 0.709 | 1.081 | −25.4 |
| Inv. Ex. 7 | 0.189 | 0 | 0.811 | 1.081 | −23.9 |

The dynamic physical parameters of Comparative Example 3, made from difunctional and trifunctional compound, and Inventive Example 6, made from monofunctional and trifunctional compound, will now be compared. FIG. 1 illustrates the relationship of modulus (log G, left hand axis) and Loss Factor (right hand axis) as a function of frequency for the two compounds in a high-frequency mastercurve plot, for Comparative Example 3 (circles) and Inventive Example 6 (triangles). The arrows indicate the axes to which the curves refer. The behavior of Inventive Example 6 and Comparative Example 3 between 1 Hz and $10^{14}$ Hz can be seen to behave similarly in this plot, which compares high frequency behavior.

Figure 2:
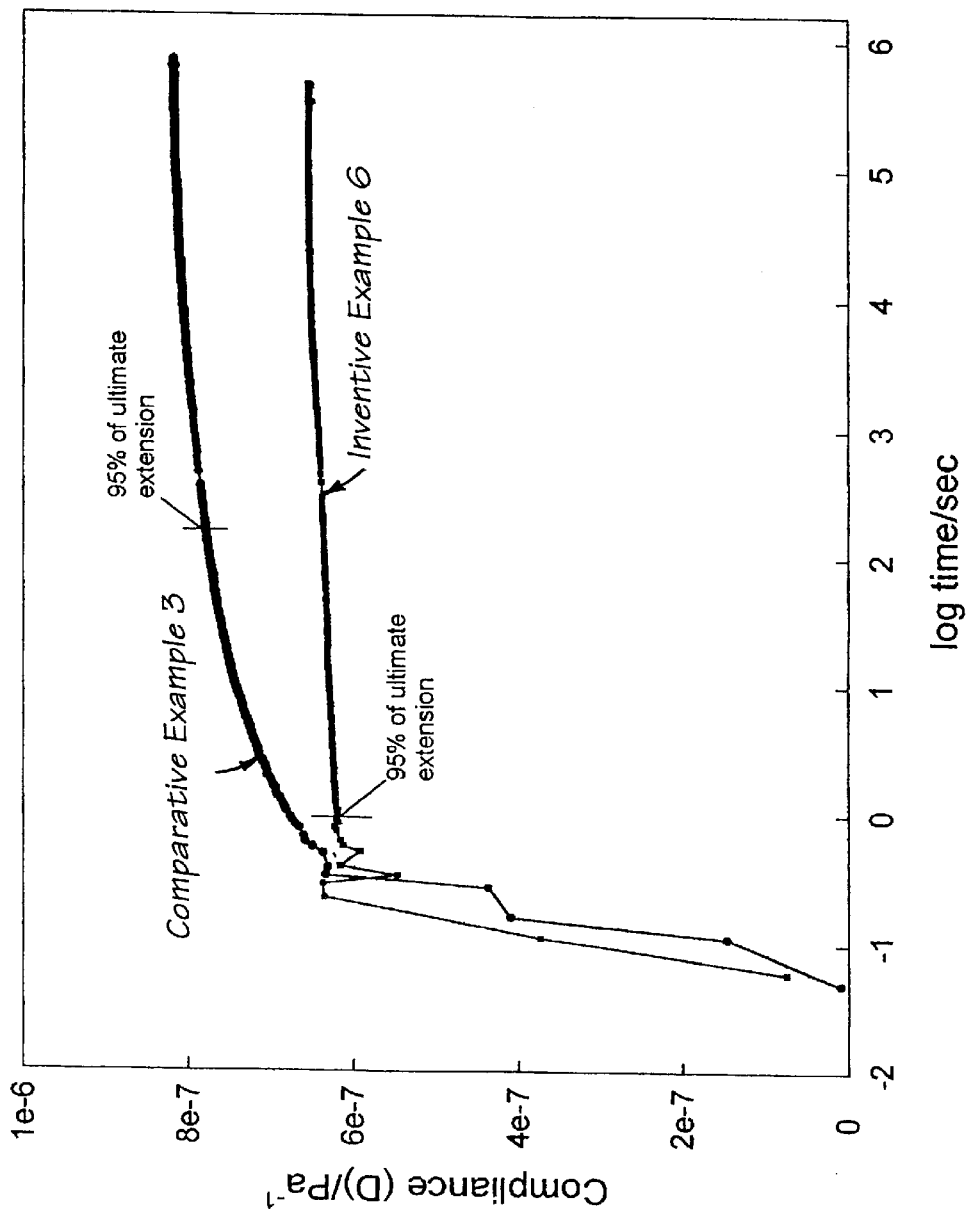
FIG. 2 is a chart comparing creep compliance data of an example of a polymer composition of the invention to a comparative polymer composition.

An additional dynamic parameter of interest is creep compliance. FIG. 2 illustrates a comparison of Inventive Example 6 and Comparative Example 3 in a creep compliance study. As discussed above, these two compositions behave similarly in the master curve data of FIG. 1. In FIG. 2, the composition of Inventive Example 6 (squares) can be seen to reach 95% of ultimate extension in approximately 0.9 s, having reached 90% of ultimate extension in less than 0.9 s. By comparison, Comparative Example 6 (circles) reaches 90% extension in approximately 10 s and 95% in 136 s.

Table II compares creep compliance data for selected Inventive Examples and Comparative Examples, and also tabulates the average functionality of the polymer composition as determined from the relative mole fractions of the ingredients. In Table II, $G_0$ is the rubbery modulus obtained from the endpoints (i.e., long time) of the creep compliance versus time curve, where creep compliance is virtually independent of time. At the endpoint, $G_0=\frac{1}{3}$(creep compliance). The time to 95% of ultimate elongation is presented in Table II.

The inventive examples can been seen to generally have lower values of rubbery modulus than the comparative examples of similar average functionality. The Inventive Examples illustrate that it is possible in the present invention to obtain rubbery modulus values below 0.4

TABLE II

Creep Compliance Data of Polymer Composition Examples.

| Label | $F_n$ | $G_0$/MPa | $time_{95\%}/s$ |
|---|---|---|---|
| Comp. Ex. 2 | 2.12 | 0.11 | 14980 |
| Comp. Ex. 3 | 2.20 | 0.41 | 136 |
| Comp. Ex. 4 | 2.40 | 0.74 | 0.7 |
| Comp. Ex. 5 | 2.60 | 0.87 | 0.5 |
| Comp. Ex. 6 | 2.97 | 1.15 | 0.5 |
| Inv. Ex. 1 | 1.99 | 0.09 | 22 |
| Inv. Ex. 3 | 2.12 | 0.25 | 5.4 |
| Inv. Ex. 5 | 2.20 | 0.29 | 1.5 |
| Inv. Ex. 6 | 2.40 | 0.5 | 0.9 |
| Inv. Ex. 7 | 2.60 | 0.94 | 0.7 |

Mpa, or even below 0.1 Mpa.

When the examples having relatively low values of $G_0$ (less than 0.4 MPa) are considered, the Inventive Examples can be seen to generally have much lower values of the time to 95% extension than the Comparative Examples. For example, Comparative Example 2, with $G_0$ of 0.11 MPa, exhibits a very long time of 14980 s, while Inventive Example 1, with $G_0$ of 0.09 MPa, exhibits a much shorter time of 22 s. Thus, compositions of the invention may have both the properties of being soft and of having rapid response. This combination of properties is generally difficult to achieve in the comparative polymers. In particular, a sharp rise is seen in the time to 95% extension of the Comparative Examples have $G_0$ of about 0.4 MPa or less.

Thus, it can be seen that polymer compositions of the invention may be prepared having, for example, a value of rubbery modulus less than 0.4 MPa, or even less than 0.1 MPa.

Polymer compositions can be prepared, for example, having a creep compliance characterized in reaching 95% of the ultimate elongation in less than 2 s, or even less than 1s. And, it is possible, for example, to prepare a polymer composition of the invention which both has a value of rubbery modulus less than 0.4 MPa and has a creep compliance characterized in reaching 95% of the ultimate elongation in less than 2 s.

The polymer compositions of the invention may be used in a variety of applications, and the dynamic properties which are achievable in these compositions may make them particularly useful for certain applications, such as those involving vibration damping.

For example, the polymer compositions could be used in stock mounts, such as those used in motor mounts, or bridges, in buildings, or in optical work. A schematic shock mount is illustrated in FIG. 3A, in which a piece of the polymer composition 305 is sandwiched between two plates 310. Many shock mount designs using elastomers are known in the art, and the polymer composition of the present invention could be used as the elastomer of such a shock mount.

The polymer composition of the invention could also be used as an adhesive or a caulk. In these cases, after mixing the reactants, the composition would be applied to pieces to be joined, or laid as a bead of caulk, before curing.

The polymer composition of the invention could also be used as a surface coating in a variety of applications. For example, as shown schematically in FIG. 3B, the composition could be used as a coating on the interior surface of a pipe serving as a liquid conduit. In FIG. 3B, pipe 320 has coating 330. As such, it might serve to reduce drag in the liquid flowing in the pipe. This might be useful for pipes carrying water or petroleum. The composition could also be used as an exterior coating on a watercraft. Here, watercraft refers to any object routinely moving through water, and would include boats, submarines, torpedoes, scuba divers, etc., A composition which reduces drag would lead to more efficient movement of the watercraft.

The composition could also be used as a surface coating on a water turbine or propeller, as shown schematically in FIG. 3C, in which turbine or propeller blade 350 has coating 360. Here, the vibration damping properties of the polymer composition might prevent cavitation damage to the turbine or propeller.

While particular embodiments of the polymer composition of the invention and of its preparation and use have been described, it is to be understood that the present invention is not limited to these embodiments. Various changes and modifications may be made without departing from the spirit and scope of the invention, as defined by the appended claims.

What is claimed is:

1. A cross-linked polymer composition, said composition consisting essentially of:
a first subunit having a structure represented by

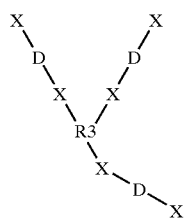

where R3 is an organic group of molecular weight greater than 200, D is an organic group, and X represents a urethane linkage group; and
a second subunit having a structure represented by R1—X—D—X, wherein R1 is a linear, monofunctional organic group of molecular weight greater than 140 and less than an average of about 500, and
wherein the molar ratio of groups R3 to group R1 is in the range of 9:1 to 1:2 so that a cross-linked composition is formed.

2. The polymer composition of claim 1, wherein group R3 has a molecular weight of greater than 600.

3. The polymer composition of claim 2, wherein group R3 has a molecular weight in the range of 1000 to 5000.

4. A polymer composition, comprising:
a first subunit having a structure represented by

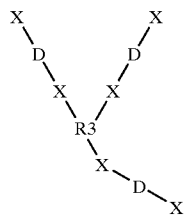

wherein R3 is an organic group of molecular weight greater than 200, D is an organic group, and X represents a urea linkage group; and
a second subunit having a structure represented by R1—X—D—X, where R1 is a monofunctional organic group of molecular weight greater than 140.

5. The polymer composition of claim 1, wherein group R1 comprises a polyether subunit.

6. The polymer composition of claim 5, where group R1 comprises the subunit: [—CH$_2$—CH(CH$_3$)—O—CH$_2$—CH(CH$_3$)—O—].

7. The polymer composition of claim 1, wherein group R3 comprises a polyether subunit.

8. The polymer composition of claim 7, where group R3 comprises the subunit: [—CH$_2$—CH(CH$_3$)—O—CH$_2$—CH(CH$_3$)—O—].

9. The polymer composition of claim 6, where group R3 comprises the subunit: [—CH$_2$—CH(CH$_3$)—O—CH$_2$—CH(CH$_3$)—O—].

10. The polymer composition of claim 1, wherein group R1 comprises a subunit which is a polyester, a polybutadiene or a polyamide.

11. The polymer composition of claim 1, wherein group R3 comprises a subunit which is a polyester, a polybutadiene or a polyamide.

12. The polymer composition of claim 1, wherein the molar ratio of groups R3 to groups R1 is in the range of 4:1 to 1:1.

13. The polymer composition of claim 1, the value of rubbery modulus of the composition being less than 0.4 MPa.

14. The polymer composition of claim 13, the value of rubbery modulus of the composition being less than 0.1 MPa.

15. The polymer composition of claim 1, the creep compliance of said composition being characterized in reaching 95% of the ultimate elongation in less than 2 s.

16. The polymer composition of claim 15, the value of rubbery modulus of the composition being less than 0.1 MPa.

17. The polymer composition of claim 1, wherein the mole ratio of linkage groups X to groups D in the polymer composition is approximately 2:1.

18. The polymer composition of claim 17, said composition being made using a diisocyanate of structure OCN—D—NCO.

19. A method of making a cross-lined composition, consisting essentially of:
making a mixture:
a first compound which is an organic trifunctional hydroxy compound of molecular weight greater than 250;
a second compound which is an organic linear monofunctional hydroxy compound of molecular weight greater than 155 and less than an average of about 500; and
an organic polyisocyanate compound, the amount of said organic polyisocyanate compound being within 10% of the stoichiometric ratio of one isocyanate group to one hydroxy group of the first or second compound; and
allowing the mixture to cure until the reaction of the isocyanate group and hydroxy group is essentially complete; and
wherein a molar ratio of the first compound to the second compound is in the range of 9:1 to 1:2.

20. The method of claim 19, said mixture comprising the organic polyisocyanate compound within 3% of said stoichiometric ratio.

21. A method of making a cross-linked polymer composition, comprising:
making a mixture comprising:
a first compound which is an organic trifunctional amine compound of molecular weight greater than 250;
a second compound which is an organic monofunctional amine compound of molecular weight greater than 155; and
an organic polyisocyanate compound, the amount of said organic polyisocyanate compound being within 10% of the stoichiometric ratio of one isocyanate group to one amine group of the first and second compound; and allowing the mixture to cure until the reaction of the isocyanate groups and amine group is essentially complete.

22. The method of claim 19, said mixture further comprising a catalyst for speeding the curing of the polymer.

23. The method of claim 19, said step of allowing the mixture to cure comprising maintaining the mixture at a temperature in the range of −20 to 100° C.

24. The method of claim 23, said step of allowing the mixture to cure comprising maintaining the mixture at approximately room temperature.

25. The method of claim 19, further comprising vacuum degassing the first compound, second compound and organic polyisocyanate before making the mixture.

26. The method of claim 19, said step of making the mixture further comprising mixing the first compound with the second compound before adding the organic polyisocyanate.

27. The method of claim 19, further comprising drying the first compound and second compound before making the mixture.

28. The method of claim 19, further comprising casting the mixture into a desired shape before allowing the mixture to cure.

29. The method of claim 19, further comprising selecting the ratio of the first compound to the second compound achieve a value of rubbery modulus of less than 0.4 MPa in the curved polymer composition.

30. The method of claim 19, further comprising selecting the ratio of the first compound to the second compound to yield a cured polymer having a value of rubbery modulus of less than 0.4 MPA and being characterized in having a creep compliance reaching 95% of the ultimate elongation in less than 2 s.

31. The method of claim 19, said organic polyisocyanate compound being a diisocyanate compound.

32. The method of claim 19, further comprising:
    applying said mixture as a bead of caulk before allowing the mixture to cure.

33. The method of claim 19, further comprising:
    applying said mixture as a coating on the exterior of a watercraft before allowing the mixture to cure.

34. The method of claim 19, further comprising:
    applying said mixture between pieces to be joined;
    joining the pieces before allowing the mixture to cure.

35. The polymer composition of claim 1, further comprising:
    said polymer composition being formed as a bead, for use as a caulk.

36. A pipeline, comprising:
    a coating on the interior of the pipe casing, said coating comprising a polymer composition consisting essentially of:
    a first subunit having a structure represented by

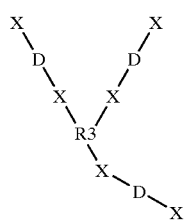

where R3 is an organic group of molecular weights greater than 200, D is an organic group, and X represents a urea or urethane linkage group; and
    a second subunit having a structure represented by R1—X—D—X, where R1 is a monofunctional organic group of molecular weight greater than 140 and less than an average of about 500; and
    wherein the molar ratio of groups R3 to groups R1 is in the range of 9:1 to 1:2 so that a cross-linked composition is formed.

37. An apparatus, comprising:
    a shock mount, said shock mount comprising a damping material said coating comprising a polymer composition consisting essentially of:
    a first subunit having a structure represented by

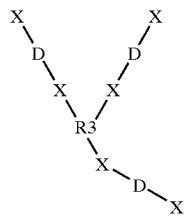

where R3 is an organic group of molecular weights greater than 200, D is an organic group, and X represents a urea or urethane linkage group; and
    a second subunit having a structure represented by R1—X—D—X, where $R_1$ is a monofunctional organic group of molecular weight greater than 140 and less than an average of about 500; and
    wherein the molar ratio of groups R3 to groups R1 is in the range of 9:1 to 1:2 so that a cross-linked composition is formed.

38. The apparatus of claim 37, further comprising:
    a motor connected to said shock mount.

39. An apparatus comprising:
    a propeller for a water craft; and
    a coating on said propeller, said coating comprising a polymer composition consisting essentially of:
    a first subunit having a structure represented by

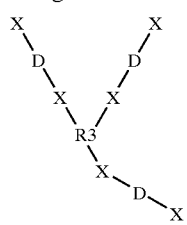

where R3 is an organic group of molecular weights greater than 200, D is an organic group, and X represents a urea or urethane linkage group; and
    a second subunit having a structure represented by R1—X—D—X, where R1 is a monofunctional organic group of molecular weight greater than 140 and less than an average of about 500; and
    wherein the molar ratio of groups R3 to groups R1 is in the range of 9:1 to 1:2 so that a cross-linked composition is formed.

40. An apparatus comprising:
    a water turbine; and
    a coating on said turbine, said coating comprising a polymer composition consisting essentially of:

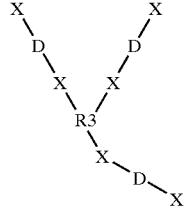

a first subunit having a structure represented by
    where R3 is an organic group of molecular weights greater than 200, D is an organic group, and X represents a urea or urethane linkage group; and
    a second subunit having a structure represented by R1—X—D—X, where R1 is a monofunctional organic group of molecular weight greater than 140 and less than an average of about 500; and
    wherein the molar ratio of groups R3 to groups R1 is in the range of 9:1 to 1:2 so that a cross-linked composition is formed.

* * * * *